United States Patent [19]

Spector

[11] 4,323,301

[45] Apr. 6, 1982

[54] COLLAPSIBLE REAR/FRONT PROJECTION SCREEN ASSEMBLY

[76] Inventor: Donald Spector, 380 Mountain Rd., Union City, N.J. 07087

[21] Appl. No.: 149,740

[22] Filed: May 14, 1980

[51] Int. Cl.³ .............................................. G03B 21/56
[52] U.S. Cl. .................................................... 350/117
[58] Field of Search ......................................... 350/117

[56] References Cited

U.S. PATENT DOCUMENTS

| 3,720,455 | 3/1973 | Sahlin | 350/117 |
| 3,846,011 | 11/1974 | Stein | 350/117 |

FOREIGN PATENT DOCUMENTS

| 2307880 | 2/1973 | Fed. Rep. of Germany | 350/117 |
| 1145474 | 5/1957 | France | 350/117 |

Primary Examiner—Richard A. Wintercorn
Attorney, Agent, or Firm—Michael Ebert

[57] ABSTRACT

A collapsible and portable screen assembly which is capable when erected of acting either as a rear or front projection screen in conjunction with a slide or movie projector. The assembly is constituted by a flexible sheet of thin translucent synthetic plastic material having white pigment incorporated therein, the sheet surface being embossed to define myriad reflective facets. The sheet is framed within a continuous tubular loop having a rectangular formation and provided with a valve permitting inflation or deflation thereof. When the loop is inflated, the sheet assumes a planar form and functions either as a reflective diffuser for front projection or as a transmissive diffuser for rear projection. When the loop is deflated, the assembly may be folded into a compact package.

6 Claims, 6 Drawing Figures

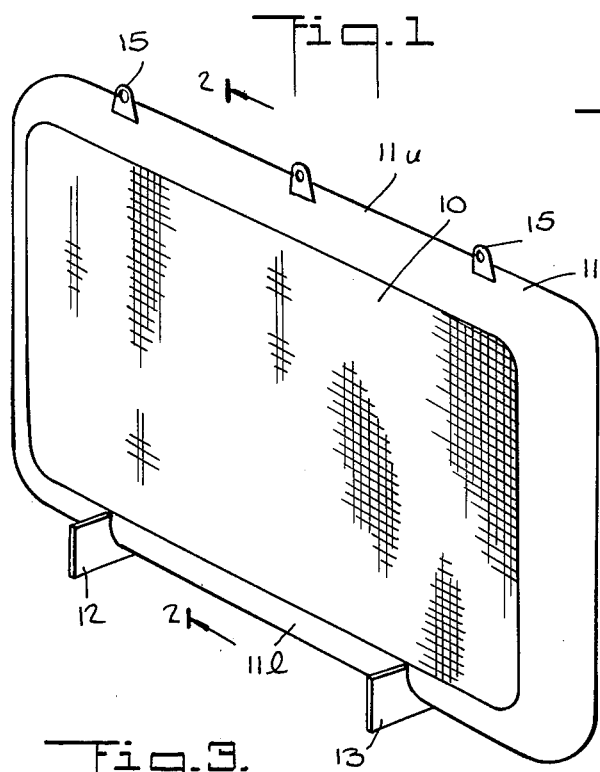
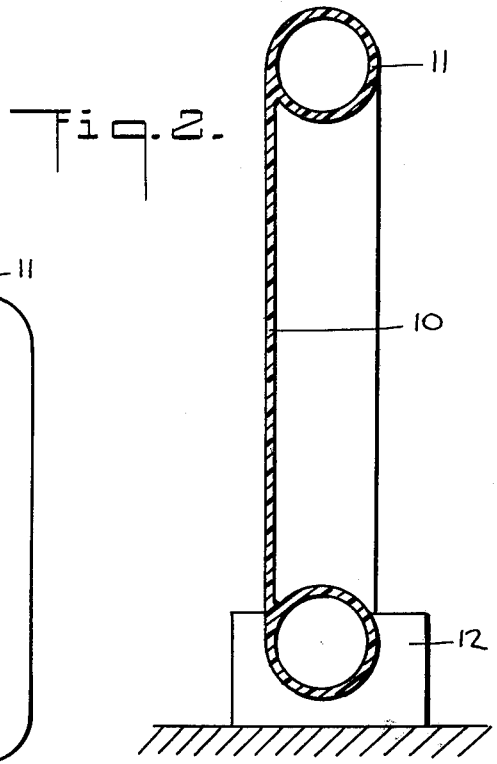
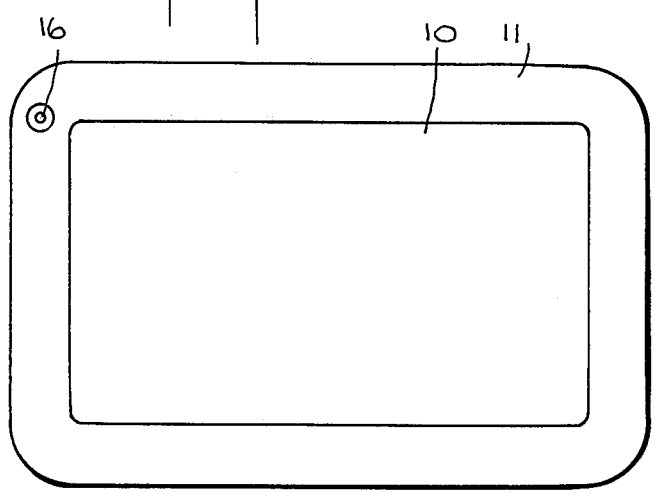
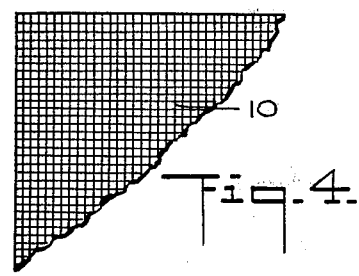
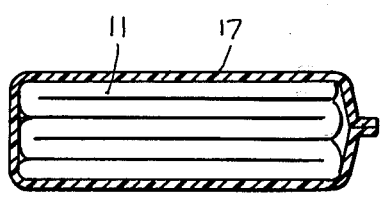
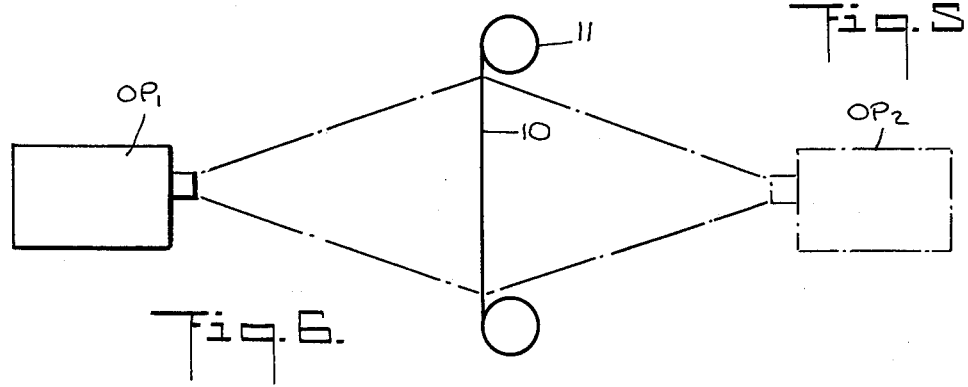

COLLAPSIBLE REAR/FRONT PROJECTION SCREEN ASSEMBLY

BACKGROUND OF INVENTION

This invention relates generally to screens for use in conjunction with optical image projectors, and more particularly to an inflatable screen adapted to function, when erected, as a rear projection or a front projection screen.

In order for a sheet to function effectively as a viewing screen for images projected onto the front surface thereof, the surface must be of a reflective character and have diffusion properties. Thus the conventional rear projection screen is formed of opaque reflective material having diffusion properties which causes light impinging thereon to be scattered in all directions. A perfect or Lambertian diffuser is one that has the same apparent brightness from any angle.

Matte white paper is a good reflecting diffuser, for it reflects 70 to 80% of the incident visible light. But in front projection screens for use with slide or movie projectors, higher efficiencies are required, particularly with non-professional or home equipment having relatively low wattage lamps. For this purpose, opaque screen surfaces having magnesium oxide and magnesium carbonate particles embedded therein are frequently used; for their efficiencies are high, in the order of 97 or 98%.

With rear projection screens, transmissive diffusing material must be used to produce even illumination. Thus transparent glass or acrylic materials containing a suspension of minute colloidal particles act to diffuse light passing therethrough because of multiple scattering from these particles. Ground glass is also effective as a rear projection screen, for the multitude of very small facets produced by etching or fine grinding refract the incident light more or less randomly.

It is known to use in conjunction with home movie or slide projectors collapsible front projection screens which are stored in rolled-up condition in a cylindrical housing. Such screens can be unwound and erected, the erected screen being supported on a tripod stand. Structures of this type are relatively expensive and can function only as front projection screens.

Moreover, while highly compact slide projectors are commercially available—and these can be conveniently carried—this is not true of collapsible screens of the type heretofore known, for such screens are relatively cumbersome. It is for this reason that slides are often projected against a blank wall, even though this surface does not function efficiently as a viewing screen.

A need also exists for a screen that can serve either as a front or rear projection screen. Thus when slide projectors are used in a classroom, in order for projected slides to be viewable by students seated in the room, a front projection screen must be erected in front of the class. This makes it necessary to place the slide projector toward the rear of the classroom. If an instructor wishes, while showing slides, to comment thereon from a position in front of the class and yet able to control the slide presentation, a remote control link must be set up between the instructor and the slide projector.

A more convenient arrangement would be to have the slide projector placed in front of the class next to the instructor, with the slide images cast on a rear projector screen facing the seated students. But since there are no commercially-available collapsible or portable rear projection screens, it has not heretofore been possible to set up this more convenient arrangement.

SUMMARY OF INVENTION

In view of the foregoing, the main object of this invention is to provide a collapsible and portable screen assembly capable of acting, when erected, either as a rear or front projection screen in conjunction with an optical projector such as a slide or movie projector.

More particularly, the object of this invention is to provide a screen assembly of the above-noted type fabricated entirely of flexible, synthetic plastic material that in the collapsed state may be folded into a compact package and easily transported.

Also an object of this invention is to provide an assembly of the above-type which when erected may be placed at any convenient free-standing position or suspended from a ceiling or wall.

Still another object of this invention is to provide an assembly of the above-type which operates efficiently either as a rear or front projection screen assembly which can be manufactured and sold at low cost.

Briefly stated, these objects are attained in a collapsible and portable screen assembly constituted by a flexible sheet of translucent synthetic plastic material having incorporated therein a white pigment, the sheet surface being embossed to define myriad minute reflective facets. The sheet is framed within a continuous tubular loop having a rectangular formation and provided with a valve permitting inflation or deflation thereof.

When the loop is inflated, the sheet assumes a planar form within the erected frame and functions either as a reflective diffuser for front projection or as a transmissive diffuser for rear projection. When the loop is deflated, the assembly may be folded into a compact package.

OUTLINE OF DRAWINGS

For a better understanding of the invention as well as other objects and further features thereof, reference is made to the following detailed description to be read in conjunction with the accompanying drawings, wherein:

FIG. 1 is a front perspective view of a collapsible rear/front projection screen assembly in accordance with the invention shown in its erected position;

FIG. 2 is a transverse section taken in the plane indicated by line 2—2 in FIG. 1;

FIG. 3 shows the assembly in its flat collapsed state as seen from the rear;

FIG. 4 shows a portion of the screen surface;

FIG. 5 shows the collapsed assembly in a folded portable state; and

FIG. 6 schematically illustrates how the erected screen can serve either for front or rear projection.

DESCRIPTION OF INVENTION

Referring now to FIG. 1, there is shown an assembly in accordance with the invention, the assembly being composed of a flexible sheet 10 of screen material framed within an inflatable tubular loop 11 having a rectangular configuration. The margin of the sheet is thermally welded or otherwise bonded to the frame.

The assembly in FIG. 1 is shown in its erected state. In order to hold the assembly upright in a free-standing position on the floor, the inflated lower side 11*l* of the tubular frame is forced into the slots of a pair of spaced rectangular plates 12 and 13, which may be formed of cardboard or any other inexpensive material to function as vertical uprights for the assembly.

Both the tubular loop frame 11 and the sheet 10 are fabricated of low-cost flexible thermoplastic synthetic film such as polyvinyl chloride or polypropylene. Sheet 10 is formed of a transparent plastic which contains a white pigment, preferably constituted by fine particles of titanium dioxide which functions as a diffusion agent. At least one surface of sheet 10, as best seen in FIG. 4, is thermally embossed to define thereon myriad white reflective facets which cause light scattering in all directions, thereby further promoting diffusion.

The material of the loop is preferably of a heavier gauge than that of the screen sheet to provide a stable structure when the assembly is erected.

To this end, the heated embossing roll for the plastic film may have a pattern of closely-spaced intersecting vertical and horizontal lines which when embossed into the vinyl surface of the screen create a multitude of fine facets. The resultant screen, because of its thin translucent structure, is both reflective and transmissive in character. It can, as shown in FIG. 6, therefore function as a front projection screen in conjunction with an optical projector $OP_1$ facing the front of the screen, or as a rear projection screen in conjunction with an optical projector $OP_2$ facing the rear of the screen.

The tubular loop frame 11, which is preferably formed of a dark pigmented material, is provided at its upper side $11_u$ with a set of integral tabs 15 having eyelets therein whereby the assembly, instead of standing on the floor, may be suspended from a ceiling or wall.

The tubular loop frame is provided at its rear with a valve 16 for inflation or deflection of the assembly. In practice, for quick erection use may be made of a cartridge containing a pressurized gas which can be coupled to the valve to rapidly inflate the loop. When the assembly is deflated, it may be folded into a compact package, as shown in FIG. 5, and placed in a carrying pouch 17 for ease of storage and transport. Thus a user may without difficulty carry both a screen assembly package and a slide projector. The fabrication of the tubular loop frame may be carried out in a manner similar to the inflatable gunnel of a buoyant life raft or small plastic swimming pool, except that the frame must have a rectangular configuration with relatively sharp corners.

While there has been shown and described a preferred embodiment of a collapsible rear/front projection screen assembly in accordance with the invention, it will be appreciated that many changes and modifications may be made therein without, however, departing from the essential spirit thereof.

I claim:

1. A collapsible and portable screen assembly capable of acting, when erected as a rear or front projection screen in conjunction with an optical projector, said assembly comprising:

A. a frame consituted by an inflatable tubular loop formed of flexible plastic material having a rectangular formation and provided with valve means to effect inflation or deflation thereof; and B. a screen sheet formed of thin flexible translucent plastic material whose margins are secured to said frame, said sheet having fine particles of titanium oxide dispersed therein to impart whiteness thereto and to function as a diffusion agent, said sheet being thermally embossed to define thereon myriad white reflective facets which cause light scattering in all directions, thereby causing the sheet to be both reflective and transmissive and to have light scattering characteristics, whereby when the loop is inflated the sheet assumes a planar form and functions either as a front or rear projection screen, and deflated loop and screen being foldable into a compact package.

2. An assembly as set forth in claim 1, wherein said loop has a dark pigment thereon.

3. An assembly as set forth in claim 1, wherein said loop is made of a heavier gauge material than said sheet.

4. An assembly as set forth in claim 3, wherein said loop and sheet are fabricated of vinyl material.

5. An assembly as set forth in claim 1, wherein the upper side of said loop is provided with integral tabs to facilitate suspension of the assembly.

6. An assembly as set forth in claim 1, further including removable upright plates attachable to the lower side of the loop to support said assembly on a floor.

* * * * *